United States Patent
Kahn

[11] 3,973,203
[45] Aug. 3, 1976

[54] CARRIER ISOLATION SYSTEM

[76] Inventor: Leonard R. Kahn, 70 N. Grove St., Freeport, N.Y. 11520

[22] Filed: Sept. 30, 1974

[21] Appl. No.: 510,445

Related U.S. Application Data

[63] Continuation-in-part of Ser. No. 288,704, Sept. 13, 1972, abandoned.

[52] U.S. Cl. ............... 325/330; 325/351; 325/467
[51] Int. Cl.² .......................................... H04B 1/68
[58] Field of Search ............ 325/49, 50, 328, 329, 325/330, 351, 364, 420, 467, 472, 473; 179/15.55 R; 329/50, 122; 178/5.8 AF

[56] References Cited
UNITED STATES PATENTS

| | | |
|---|---|---|
| 2,227,902 | 1/1941 | Hahnle................................ 325/328 |
| 2,276,863 | 3/1942 | Peterson.............................. 325/329 |
| 2,498,242 | 2/1950 | Boykin............................. 178/5.8 AF |
| 3,147,437 | 9/1964 | Crafts et al. ........................... 325/49 |
| 3,199,037 | 8/1965 | Graves................................ 329/122 |
| 3,541,266 | 11/1970 | Klayman et al. ............. 179/15.55 R |

*Primary Examiner*—Robert L. Griffin
*Assistant Examiner*—Jin F. Ng
*Attorney, Agent, or Firm*—Albert F. Kronman

[57] ABSTRACT

A circuit is described for operating on a carrier wave in a transmission signal including a reduced carrier with a single sideband. The carrier wave is isolated, limited, divided in frequency by a predetermined amount, and then restricted in frequency by a band pass filter. The output of the band pass filter is then multiplied in frequency. After this, the carrier wave is mixed with the sideband frequencies and the signal is demodulated.

9 Claims, 4 Drawing Figures

CARRIER ISOLATION SYSTEM

REFERENCE TO CO-PENDING APPLICATION

This application is a continuation-in-part of patent application, Ser. No. 288,704, filed Sept. 13, 1972, now abandoned.

BACKGROUND OF THE INVENTION

Many communication systems require the isolation of the carrier portion of the modulated wave. For example, in reduced carrier (A3A) transmission the carrier is transmitted along with the sideband frequencies at a reduced amplitude, generally 10 to 20 db below the peak sideband level. In many situations, this carrier wave is used to demodulate the sideband signal in a product demodulator. This insures that the recovered frequency components will be accurate and will protect the system against frequency errors due to the frequency doppler shifts. Such systems have been in use for communication for many years and have generally given good service.

One of the problems connected with this type of transmission system is that it is necessary that the band width of the isolating filter be wide enough to follow drift and frequency errors but narrow enough so that desired sideband components do not disturb the performance of the system. This requires, in single sideband systems, that the carrier filter pass only the desired frequency plus or minus a shift of 100Hz. In most transmitters which carry voice frequencies, the frequency response is restricted so that the lowest audio frequency is greater than 300 Hz. If the transmitter filter circuits are sufficiently selective and are stable, this system works fairly well.

However, there are some cases where the low pass filter has changed, due to temperature changes or aging, and there is some response at frequencies as low as 50 Hz. Also, there are cases where the carrier frequency drifts to the edge of the sideband filter, thereby permitting the low frequency components of the sideband to fall within the passband of the carrier filter. In this case, the sideband components will produce objectional phase modulation components and introduce distortion. The invention described herein greatly reduces this problem, making such systems relatively free of such difficulties.

The invention is based upon the fact that frequency division or frequency multiplication does not change the spacing of the sideband frequencies relative to the carrier. For example, if a single-sideband transmitter is modulated with a 100 cycle tone, the lowest separation between the sideband and the carrier is 100 Hz. This separation is maintained no matter how many times the signal is multiplied or divided in frequency.

In the Marine radio telephone field, a specification of ± 100 cycles per second for the accuracy of the carrier frequency has been standardized for certain types of modulation. For this reason, the band width of the carrier channel must be at least ± 100 Hz in order to handle the transmissions properly. Since it is possible that the transmitter carrier wave be at the edge of its tolerance, say 100 Hz low, upper sideband components at 200 Hz from the carrier just pass the selectivity requirement. These sideband components may be fairly strong and, since in the A3A transmission the carrier is at least 10 db below the sideband, it is possible that distortion may result.

The basic idea of the invention is to divide the frequency of the carrier frequency wave. Frequency division reduces the amount of frequency error which is permissible in the system. The carrier wave is first filtered by a crystal filter having a band width of ± 100 Hz. Then, the resulting wave is passed through a limiter to remove all traces of amplitude modulation and then the carrier frequency is divided by 8 by any of the known division circuits. If the original carrier had a frequency of 100 KHz, the divided wave has a frequency of 12.5 KHz. A frequency error at the input frequency of 100 Hz will now be an error of 12.5 Hz. The band pass filter which lies between the dividing and multiplying circuits should have a band width of only ± 12.5 Hz. An ordinary band pass circuit filter can be used for this purpose, but it is believed that a phase locked loop is preferable. Other active circuits, such as a locked oscillator, have been considered, but it is believed that the phase locked loop is the best. The phase locked loop as used in this situation acts like a tracking filter which follows frequency errors within the range of ± 12.5 Hz; however, due to the circuitry that restricts its speed, effectively cuts off undesired sideband components.

Additional details of the invention will be disclosed in the following description, taken in connection with the accompanying drawings.

DETAILED DESCRIPTION

Figure 1:
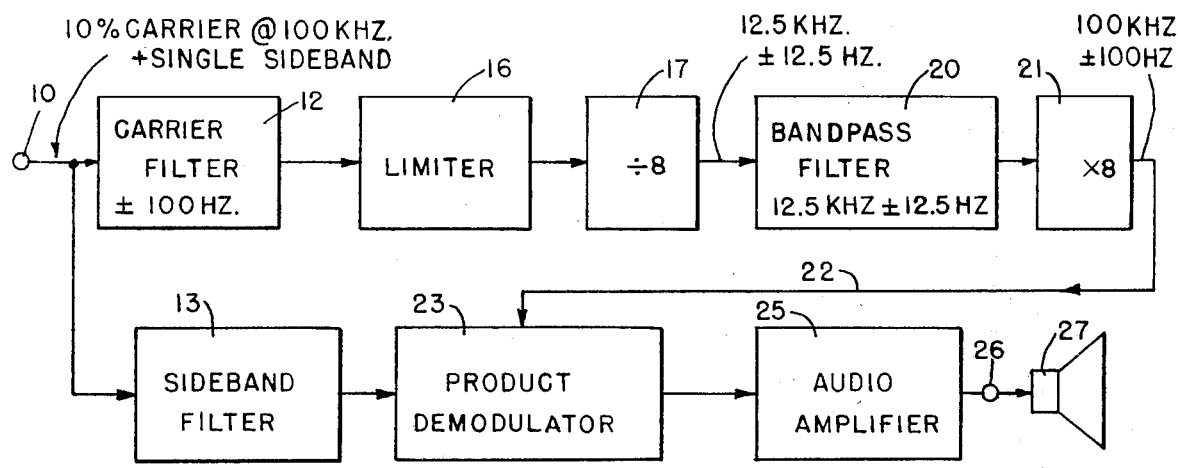
FIG. 1 is a schematic wiring diagram in block showing one embodiment of the invention.

Referring now to FIG. 1, input terminal 10 indicates the connections which are to be made to a circuit which supplies an incoming SSB modulated wave. This signal is applied to a carrier filter 12 and to a sideband filter 13. The carrier filter 12 may be very narrow but the sideband filter 13 must have considerable band width since it must pass frequencies which include from 100.2 KHz to 102.5 KHz, this region being indicated by the rectangle 14 in FIG. 3. The carrier filter 12 is rated to pass a nominal 100 KHz wave, but due to the frequency instability of some of the sending components, the filter must pass frequencies within the range of 100 KHz ± 100 Hz, this range and amplitude being indicated by the rectangle 15 in FIG. 3.

The output of the carrier filter 12 is applied to a limiter 16 which removes all traces of amplitude modulation if there be any. The output of the limiter 16 is then applied to a divider circuit 17 which divides the frequency by 8. This divider may be a three-stage bistable multivibrator or any other well known divider means. The frequency in the output circuit of this divider is a nominal 12,500 Hz, but it is subject to the same percentage variation as the input or 12.5 cycles per second. The output of this divider circuit 17 is indicated by the narrow rectangle 18 in FIG. 4, this wave being applied to a band pass filter circuit 20 which may be a crystal filter.

The output from the band pass filter is now applied to a multiplier circuit 21 which multiplies the frequency by 8 and produces the same carrier frequency as the original input signal. This wave is next applied over conductor 22 to a product demodulator 23. The demodulator 23 also receives sideband frequencies from filter 13. The output from the demodulator 23 may be amplified by an audio amplifier 25 and then sent to terminal 26 and a load 27 which may be a loud speaker or a voice recorder.

Figure 2:
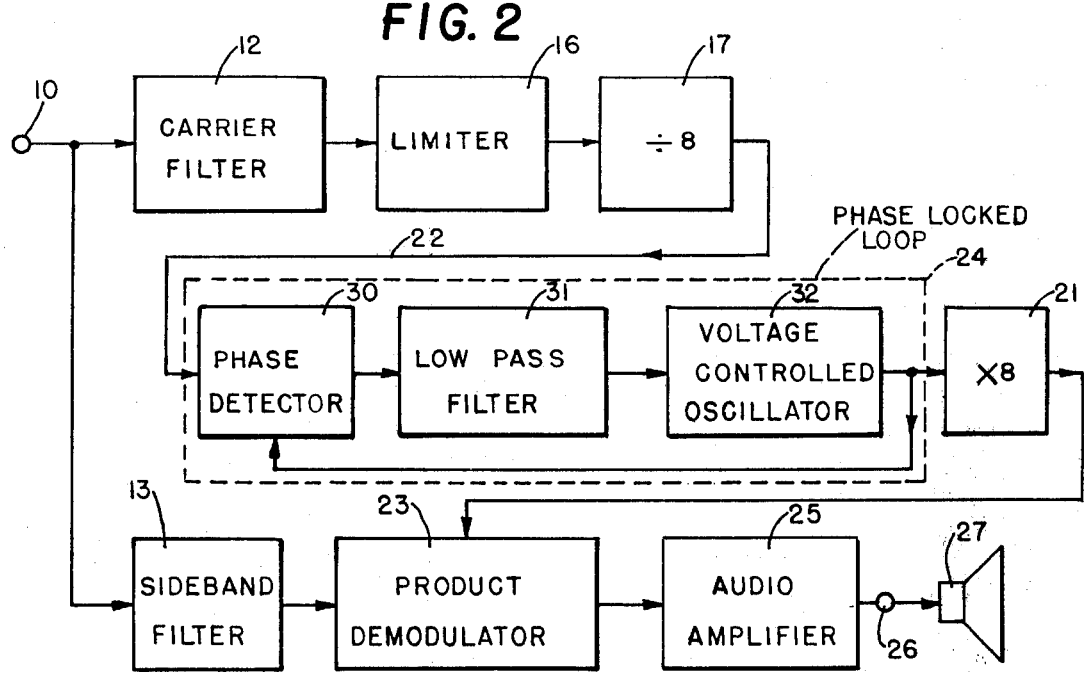
FIG. 2 is a schematic wiring diagram also in block showing the addition of a phase locked loop which may be used instead of the band pass filter in FIG. 1.

The phase locked loop 24 is an alternate circuit for use in filtering the signal after division and may be used instead of circuit 20. This circuit 24 is shown in FIG. 2 and includes a phase detector 30, a low pass filter 31, and a voltage controlled oscillator 32. The phase locked loop as used in this circuit acts like a tracking filter which will follow frequency errors due to the 12.5 cycles per second variations, yet due to the circuitry that restricts its speed, it effectively attenuates all the side band components lying outside the desired range.

The phase detector 30 receives one of its inputs from the divider circuit 17. The other input comes from the voltage controlled oscillator 32 and is a 12.5 KHz wave. The oscillator 32 is part of the loop 24 and receives its input energy from the low pass filter 31. The filter 31 receives its energy from the phse detector 30. The range of frequencies passed by this loop circuit is determined by the cut-off frequency of the low pass filter 31. A typical cut-off frequency is 25 Hz. The output of the filter 31 controls the frequency of the oscillator 32 which is sent back to the phase detector 30, thereby closing the loop.

Figure 3:
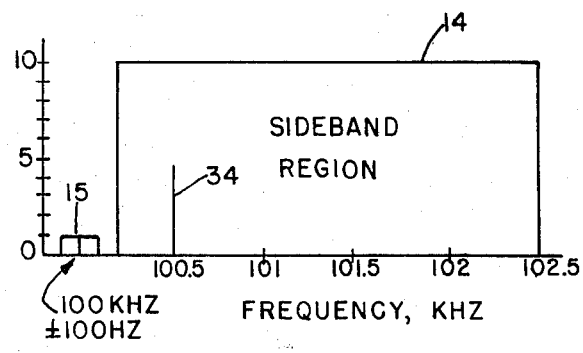
FIG. 3 is a graph showing the frequency and amplitude relations between the carrier wave and the region in which sideband waves can exist. This figure is for the normal reduced carrier with single sideband (A3A).
Figure 4:
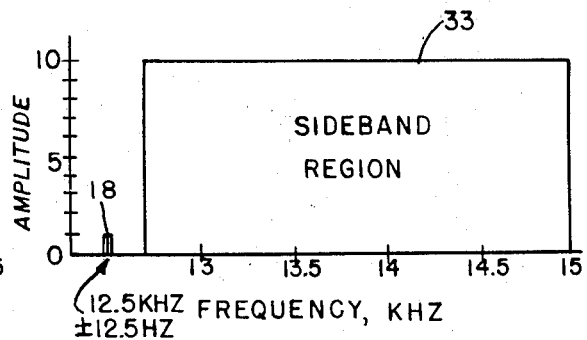
FIG. 4 is a graph similar to FIG. 3, but showing the carrier wave after having been divided by 8 and a sidebane region also having ⅛ the normal frequency values.

It should be noted that the region 14 in FIG. 3 and a similar region 33 in FIG. 4 are areas where the sideband waves may occur. When there is no modulation of the carrier, there is no wave energy at all in this range. When a pure tone of say 500 Hz modulates the carrier at a 50 percent modulation, a single sideband 34 having a frequency of 100,500 Hz and a relative amplitude of 0.5 results. Both sideband regions 14 and 33 are drawn to indicate a sideband range of 200 Hz to 2.5000 Hz.

The essence of the invention is contained in the process of segregating the carrier wave from its sideband components, dividing its frequency by an integer factor greater than 1, filtering the resulting wave by the use of a narrow efficient filter, multiplying the filtered wave by the same integer factor, and combining the resultant carrier wave with the sideband components.

Having thus fully described the invention, what is claimed as new and desired to be secured by Letters Patent of the United States, is:

1. A method of operating on a received amplitude modulated carrier wave so as to reduce unwanted noise and undesired frequency waves, comprising the following steps:
   a. filtering the carrier wave from the amplitude modulated wave;
   b. dividing the carrier wave frequency by a factor greater than unity;
   c. filtering the divided carrier wave to reduce the noise and unwanted frequencies adjacent to the carrier wave; and
   d. multiplying the resulting carrier wave frequency by the same factor used in division to restore the original carrier wave frequency;
   e. and demodulating the received modulated wave with the restored carrier.

2. A method of eliminating undesired frequencies waves and noise which exist in close proximity to the carrier wave of an amplitude modulated single sideband received signal, comprising the following: filtering the amplitude modulated received wave to separate the carrier wave from the sideband components; dividing the frequency of the carrier wave by a factor greater than one; filtering the divided wave to reduce said undesired frequency waves and noise; multiplying the divided wave by the same factor used in dividing to restore the predivided carrier frequency wave; and demodulating the sideband waves with the restored carrier wave.

3. A method according to claim 2 wherein the carrier wave is limited after the filtering action to remove amplitude modulation.

4. In a receiving system including a receiver including a sideband carrier isolation system for separating a carrier wave from undesired accompanying components comprising:
   a. a carrier wave filter coupled to a source of a modulated wave for passing substantially only the carrier frequency wave, said filter having a frequency width sufficient to accommodate (the) expected carrier frequency shifts;
   b. a frequency divider circuit (connected) coupled to the (limiter) filter for dividing the carrier frequency wave by a predetermined amount;
   c. a bandpass filter connected to the output of the divider circuit for restricting the divided frequency wave to a predetermined variation and thereby attenuate undesired frequency components;
   d. a multiplying circuit coupled to the bandpass filter for multiplying the frequency of the carrier wave by the same factor as used by the divider circuit to restore the carrier wave to its original frequency; and,
   e. a sideband filter coupled to the source of a modulated wave for passing all the sideband frequencies; and,
   f. a demodulation circuit coupled to both the multiplying circuit and the sideband filter for demodulating the received carrier to produce an audio frequency wave.

5. A carrier isolation system according to claim 4 wherein said frequency divider circuit includes a plurality of bistable multivibrator circuits connected in tandem.

6. A carrier isolation system according to claim 4 wherein said demodulation circuit is a product demodulator, including means for combining the sideband waves with the restored carrier wave, and a rectifying means.

7. A carrier isolation system according to claim 4 wherein an amplitude limiter circuit is coupled to the carrier wave filter for eliminating traces of amplitude modulation from the carrier wave.

8. A carrier isolation system according to claim 4 wherein the bandpass filter is a phase locked loop circuit.

9. A carrier isolation system according to claim 8 wherein said phase locked loop circuit includes a phase detector, a low pass filter, and a voltage controlled oscillator.

* * * * *